(No Model.) 3 Sheets—Sheet 1.
J. F. McLAUGHLIN.
ELECTRIC RAILWAY.
No. 424,340. Patented Mar. 25, 1890.
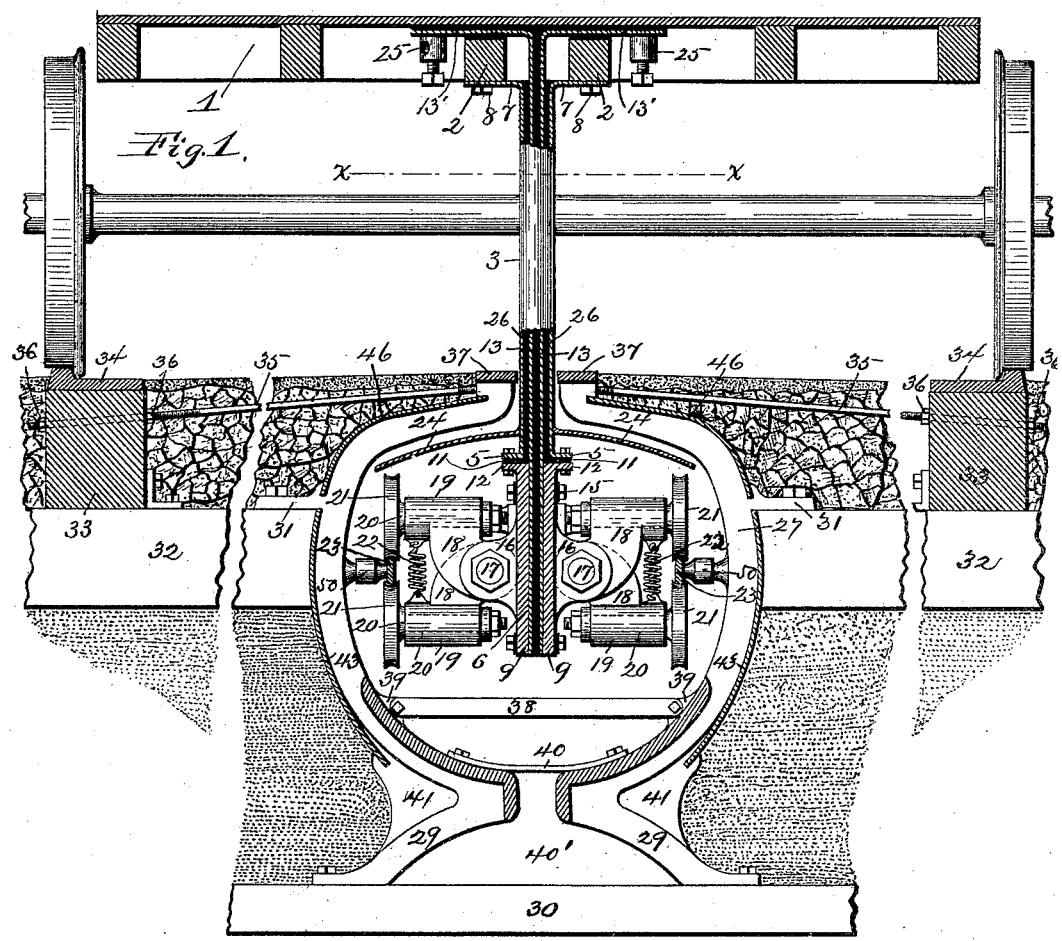
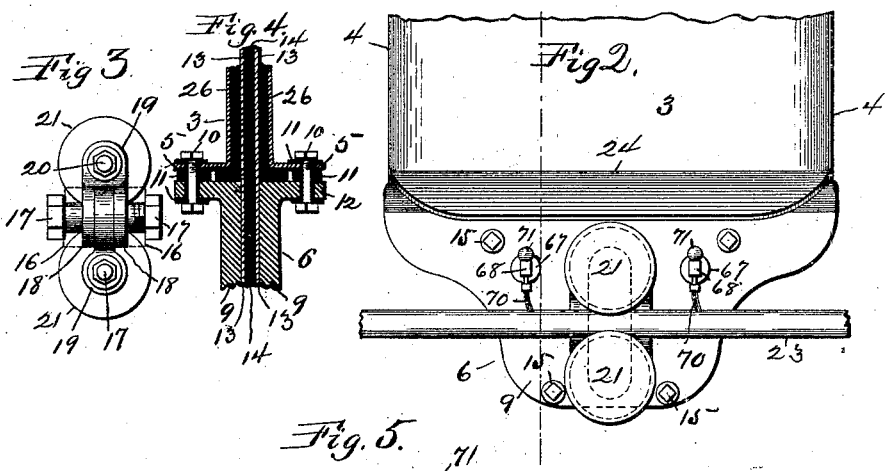
WITNESSES:
Percy C. Bowen
F. T. Chapman
INVENTOR,
James F. McLaughlin,
By Joseph Lyons,
Attorney (No Model.) 3 Sheets—Sheet 2.
J. F. McLAUGHLIN.
ELECTRIC RAILWAY.
No. 424,340. Patented Mar. 25, 1890.
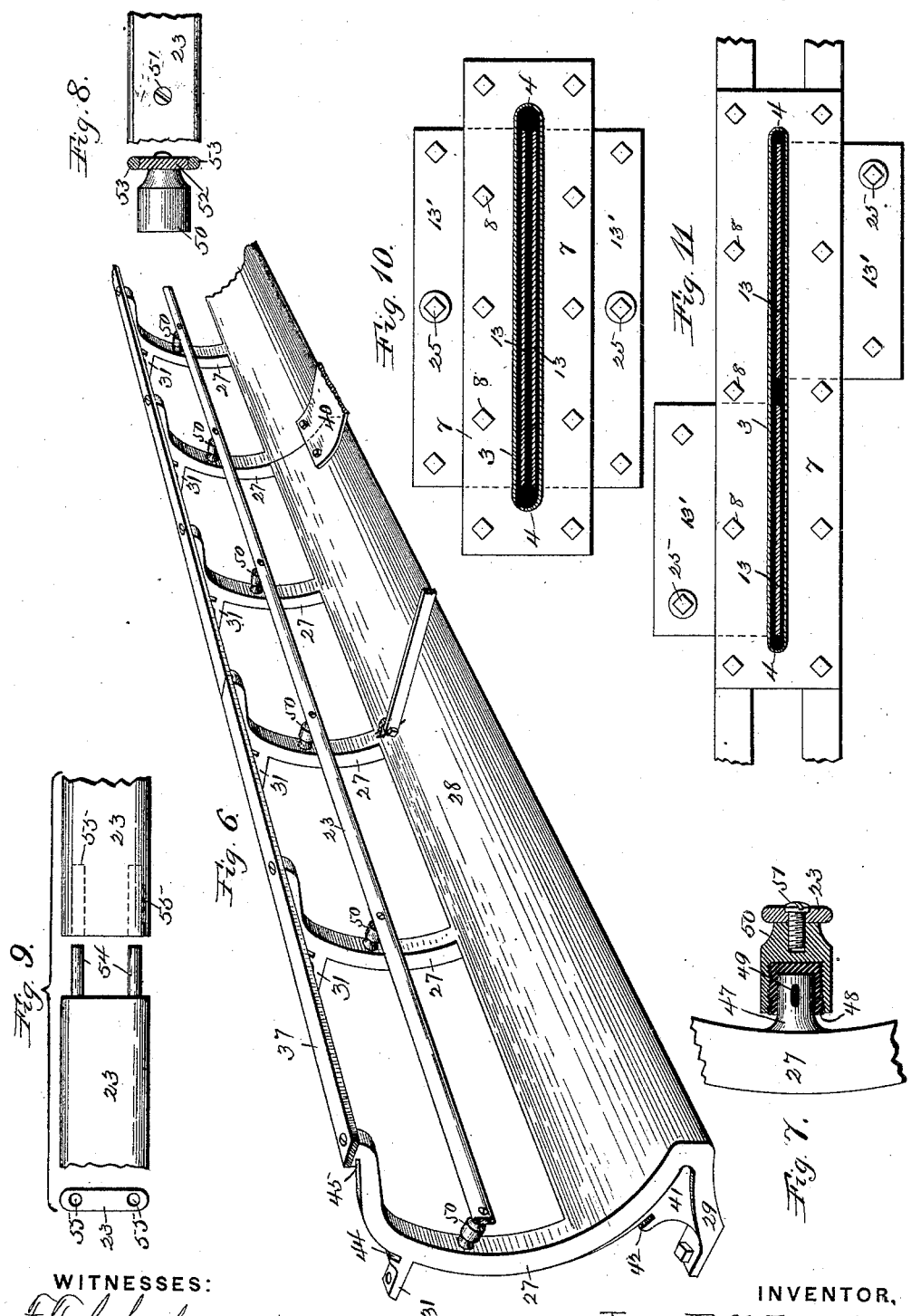
WITNESSES:
F. T. Chapman
Fannie Wise
INVENTOR,
James F. McLaughlin,
By Joseph Lyons,
Attorney

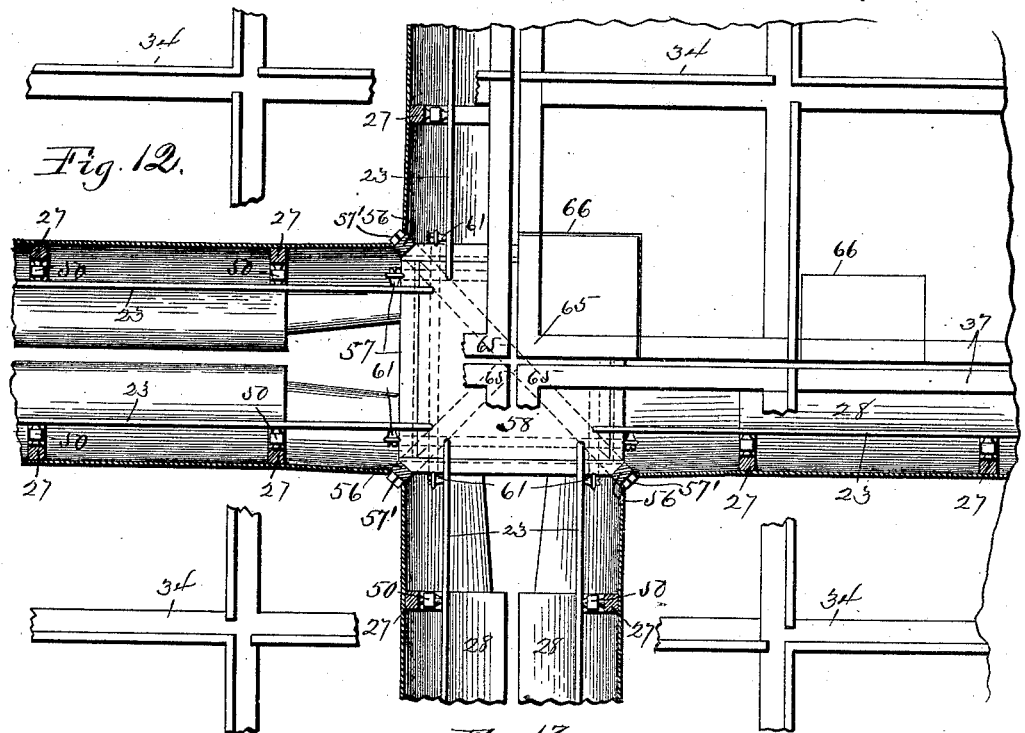

UNITED STATES PATENT OFFICE.

JAMES F. McLAUGHLIN, OF PHILADELPHIA, PENNSYLVANIA.

ELECTRIC RAILWAY.

SPECIFICATION forming part of Letters Patent No. 424,340, dated March 25, 1890.

Application filed December 27, 1889. Serial No. 335,126. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Electric Railways, of which the following is a specification.

This invention has reference to improvements in conduits and collectors for electric railways in which underground conductors are employed; and one of its objects is to produce an improved conduit and an improved traveling collector or trolley which will maintain its contact with the conductors at all times without subjecting the latter to strain, such as would be caused by the vibrations of the traveling vehicle.

To this end the invention comprises, among other things, a collector or trolley fixed to the vehicle and provided with truck-wheels having bearings pivotally connected to the fixed portion of the trolley, so that the latter may have a limited movement, during which the wheels will not be lifted or drawn away from the conductors.

A further object of my invention is to produce a crossing for conduits particularly adapted to the improved form of collector or trolley.

In arranging the conductors at the crossing so that a free passage in both directions for the collector or trolley is provided it is necessary that the continuity of such conductors should be interrupted at this point, while the electric circuit is completed by conductor-sections out of the path of the collector or trolley, and for this reason it is essential that the collector-wheels should be so supported that after having left the termination of one conductor or set of conductors at one side of the crossing they will engage the ends of the continuation of such conductor or set of conductors at the other side of the crossing, and therefore this part of my invention has reference to a support or track at the crossing on which the collector or trolley constructed according to my invention may travel without falling below the level of the conductors.

The invention also consists in the details of construction of both the collector or trolley and the conduit, and is illustrated in the accompanying drawings, in which—

Figure 1 is a vertical cross-section of a conduit and trolley or contact-truck constructed according to my invention, and also showing a portion of a car carrying the trolley or contact-truck. Fig. 2 is a side elevation of the trolley or contact-truck, and also showing a portion of the conductor and of the hanger carrying the trolley. Fig. 3 is a view of the rear of the truck-wheels and their bearings removed from the truck-body. Fig. 4 is a vertical cross-section of the truck-body and hanger at their point of connection. Fig. 5 is a detail view showing one of the conductor-cleaning brushes with its supporting-bracket. Fig. 6 is a perspective view of one-half of the frame-work of the conduit with the conductor in place. Fig. 7 is a detail section of one of the insulated conductor-supports. Fig. 8 is a front and sectional view of a modified form of conductor. Fig. 9 illustrates a mode of connecting sections of the conductor. Fig. 10 is an inverted sectional view of the trolley or contact-truck hanger, the section being taken on line $x\ x$ of Fig. 1. Fig. 11 is a similar view of a modified form of hanger for the trolley or contact-truck. Fig. 12 is a sectional view, partly in plan, of a conduit-crossing constructed in accordance with my invention. Fig. 13 is a central vertical section of the same. Figs. 14 and 15 are side elevation and plan views, respectively, of details of the construction of the crossing.

Referring now to the drawings, and more particularly to Figs. 1 to 5, inclusive, and to Figs. 10 and 11, there is shown a platform 1 of an electric-motor car, which may be of any suitable construction adapted to be used in conjunction with underground conductors.

No details of the car are shown, as such details form no part of my present invention and are in no manner necessary to a full understanding thereof.

To two longitudinal timbers 2 2, extending centrally on the under side of the car-platform, is secured a hanger 3, consisting, essentially, of a narrow oblong tubular sheet-metal body rounded at both ends, as shown at 4, Figs. 2, 10, and 11, and having integral flanges 5 5 projecting at right angles from its lower ends for the attachment thereto of a truck-body 6, hereinafter described, and at its upper end provided with integral flanges 7 7, projecting at right angles thereto and secured to the timbers 2 2 by bolts 8. The truck-body 6 consists, essentially, of two plates 9 9, bolted to the flanges 5 of the hanger 3 by bolts 10, passing through insulating-bushings 11, which surround the bolt-shanks and are interposed between the flanges 5 of the hanger 3 and flanges 12, formed on the upper end of each plate 9.

Between the plates 9 9 of the truck-body 6 are conductors 13 13, hereinafter described, each in intimate contact with the respective plate 9, and separated one from the other by insulating material 14, the whole being rigidly secured together by bolts 15, extending through both plates 9, conductors 13, and intermediate insulation 14, the said bolts being insulated from the plates and conductors by suitable bushings of insulating material similar to the bushings 11, before described. Each plate 9 has cast on its outer face, about midway of its length, two ears 16, between which are pivoted, by means of a bolt 17, brackets 18, projecting from sleeves 19, through which extend and in which are journaled the shafts or axles 20 20 of grooved trolley or truck wheels 21, placed one directly above the other. It will be observed that the bearings of the truck or trolley wheels 21 are so pivoted that they may be moved independently in a vertical plane, and are connected near their outer ends by a contractile spring 22, tending to draw the rims of the wheels into contact. However, when in operation, the truck or trolley wheels 21 run on the opposite edges of conductor-strips 23, constructed and supported in a manner to be described.

As is well known, the motor-car in moving along the track has more or less vertical vibration, and consequently, unless the trolley or truck is so constructed that it will readily yield to such movement of the car, the conductor-strips, being rigidly supported, are subjected to great strain, and there is a liability of the trolley or truck being forcibly withdrawn from the said conductor or of the latter being bent or broken. It will be seen that in the trolley or truck described provision is made for the vertical movement of the car without in the least interfering with the travel of the truck-wheels on the conductor, for when the truck-body 6 moves up or down the wheel-bearings are carried with it and turn around the pivoted bolt 17, while the rims of the wheels remain on the conductor. It will also be observed that the wheels of the trolley or truck accommodate themselves to inequalities of the conductor and maintain good contact therewith at all times, and this is due to the fact that the wheel-bearings have independent connections with the truck-body and are continually under the tension of the spring tending to force them together.

Projecting laterally from each side of the hanger 3 and immediately above the truck is a shield 24, the outer or free ends of which extend slightly beyond the truck-wheels, so that any water or dirt that may fall on this shield will be carried beyond the truck-wheels before it is allowed to fall, thus protecting the wheels from being flooded and from the wear caused by the accumulation of dirt. The conducting-strips 13 extend upward through the hanger 3 and above the same, where they are bent laterally in opposite directions under the floor of the car, as shown at 13', and to these lateral extensions or flanges are secured binding-posts 25, in which are inserted conductors (not shown) leading to a suitable electric motor situated at some convenient point on the motor-car. The insulation 14 extends to the upper end of the conductors 13 and is spread out between the laterally-extending upper ends of the said conductors and the floor of the car, as clearly indicated in Fig. 1, and there is insulating material 26 interposed between the conductor-strips and the walls of the hanger 3.

The insulation employed, and designated by the reference-numerals 14 and 26, as well as the insulating-bushings hereinbefore described, may be composed of any suitable material—such as vulcanite or vulcanized fiber—or it may be composed of any suitable composition that can be introduced in a fluid state after the conductors are placed in position, and then allowed to harden. It is immaterial for the purposes of the present invention what insulating material is employed, it being only essential that the truck or trolley wheels be intimately electrically connected with the respective conductor-strips, but thoroughly insulated one from the other. I prefer to arrange the conductor-strips 13 13 side by side, as illustrated in Figs. 1, 4, and 10; but they may be arranged one in front of the other, as shown in Fig. 11, in which instance the hanger-body 3 will be longer than that shown in Fig. 10 and at the same time considerably narrower.

The conduit for carrying the conductors and for containing the trolley I prefer to construct as shown in Figs. 1, 6, and 12 to 15. There are shown castings consisting of a number of ribs 27, joined near their lower ends by a web 28 and terminating at the lower end in a foot 29. These castings, consisting of the ribs 27 and web 28, are curved and form the two sides of a conduit, which is trough-shaped in cross-section, and the upper ends of the ribs are so bent as to form a slightly-curved top or roof for the conduit. When placed in position in the road-bed, the feet 29 are secured upon beams 30, laid in the bottom of a suitable trench of sufficient depth and in such manner that the upper and lower ends of the ribs 27 and the lower end of the web 28, are a short distance apart, as clearly indicated in Fig. 1. Near the upper ends of the ribs and projecting from the outer sides thereof are arms 31, and each of these arms is bolted to one end of a cross-tie 32, the other end of which extends outwardly from the conduit and supports a sleeper 33, on the upper face of which is fastened a track or traffic rail 34. As shown, each sleeper 33 is connected with the upper ends of the ribs 27 on the same side of the track as the said sleeper by means of straining-rods 35, the said rods being screwed into suitable nuts formed in the ribs 27 and having a screw-threaded portion extending through the sleepers, on both sides of which the rod is provided with nuts 36, for securing the same to the sleepers. These rods serve to maintain the upper ends of the ribs 27 at a fixed distance apart, and secured to the tops of the ribs 27, and extending longitudinally from one to the other, are plates 37, the inner edges of which form the walls of a slot through which extends the hanger 3, and along which the said hanger travels when the motor-car is in motion. It is essential that this slot should have a fixed relation to the track-rails and be always kept free, and this I am enabled to accomplish by means of the straining-rods 35, which rigidly connect the upper ends of the ribs 27 of the conduit with the sleepers carrying the track-rails, it being understood that the sleepers are immovably fixed. Near the lower ends of the ribs the conduit-sections are connected by bars 38, secured to eyes 39, formed on the inner faces of the ribs or webs, and the sections are joined one to the other by means of fish-plates 40, connected to the abutting ends of the sections and bridging the space between the lower ends or edges of the webs. These fish-plates serve to prevent any longitudinal displacement of the sections, while the bars 38, in conjunction with the beams 30, prevent lateral displacement of the lower end of the conduit-sections.

In the angle formed between the lower ends of the ribs 27 and the legs 29 are vertical webs 41, each having a notch 42 formed in it near the upper end and adjacent to the outer face of the rib. Into these notches is placed one edge of the sheet-metal plate 43, which extends upward to the arms 31 and is forced into contact with the outer faces of the ribs 27 by the ends of the ties 32, and a number of these plates or sheathings extending along the conduit form the two side walls of the same from the upper edge of the web 28 to the arms 31. Adjacent to the ribs 27 the arms 31 have each a notch or slot 44 on its upper side, and there is a similar slot 45 formed in the upper end of each rib below the nut formed for the reception of the straining-rod 35. Into these notches are sprung the edges of plates or sheathing 46, constituting the roof or covering of the conduit.

The trench in which the conduit is placed is filled with concrete, rubble, or other suitable material after the parts of the conduit have been assembled.

It will be seen that a secondary channel 40' is formed between the legs 29 of the ribs 27, which channel extends parallel with the conduit proper and below the same. In this secondary channel the water which finds entrance into the conduit accumulates and is carried off by suitable connections with the drainage system. These connections are not shown, since the same may be of any desired construction and form no part of my present invention.

On the inner faces of the ribs 27, about midway of their height, are formed inwardly-projecting studs 47, on each of which is secured a thimble 48, of insulating material, by means of a pin or key 49, extending through a perforation in the stud, as clearly shown in Fig. 7. The outer cylindrical surface of this thimble 48 is screw-threaded, and on it is screwed a support 50, also of insulating material, and preferably constructed of wood. To the outer ends of these insulating-supports is secured the conductor 23 by means of screws 51, entering suitable nuts formed in the said insulating-supports 50. The conductor, as shown in Fig. 7, may be formed of a flat strip of copper or other suitable conducting material, with the edges rounded for the reception of the grooved rims of the trolley or truck wheels 21; or, as shown in Fig. 8, the conductor may be formed of a flat strip or body of iron 52, to the edges of which are soldered or otherwise secured copper conductors 53, on which the trolley-wheels will travel. In this latter construction it will be seen that the body of the conductor is formed of a cheap metal, while the more expensive material of high conductivity is used for the edges only, thus greatly cheapening the cost of the conductor. It will be observed by reference to Figs. 1, 7, and 8 that the free inwardly-projecting ends of the insulating-supports 50 are conical, and that the conductor supported by the same extends with its edges fairly above and below these conical ends, so that the contact-wheels can move along the conductor without obstruction.

In order to secure a good joint between the abutting ends of sections of the conductor, I employ the construction shown in Fig. 9, in which the end of one section of the conductor is shown as provided with dowel-pins 54, and the end of the adjacent section of the conductor is provided with corresponding sockets 55 to receive the pins 54, which are so proportioned that they will fit snugly in said sockets. This construction not only insures good electrical contact between the sections of the conductor, but serves to maintain the ends in alignment, so that the trolley-wheels will pass without impediment from one section to the other.

Referring now more particularly to Figs. 12 to 15, inclusive, there is shown a construction by means of which two conduits may cross without interference. In this instance there is a frame consisting of four ribs 56 56, similar to the ribs 27, before described, but arranged at the corners formed by the conjunction of the conduits. These corner-ribs serve as a support for a horizontal bed-plate 57, the corners of which are secured to the ribs by screws or bolts 57', and at opposite ends of this bed-plate are formed undercut flanges 57'' for the reception of two of the four beveled edges of a glass plate 58. This plate is held in position on the bed-plate 57 by means of bars 59, with their ends beveled to fit in the undercut grooves in the flanges of said bed-plate, and are secured thereto by screws 60. The conductors 23 terminate directly over the beveled edges of the glass plate 58, thus leaving a clear passage at the crossing for the trolley or truck traveling in either of the intersecting conduits.

On the main conductors 23, near their ends at the crossing, are binding-posts 61, to which are secured insulated conductors 62, passing downwardly and under the bed-plate 57 and upwardly again to the binding-posts on continuations of the conductors 23 on the other side of the crossing, and these insulated conductors 62 are secured to the bed-plate by suitable brackets 63. The free ends of the main conductors 23 at the crossing are wedge-shaped, as shown at 64. It will now be seen that when the trolley or truck is traveling along either conduit and reaches the wedge-shaped ends of the conductors 23 at the crossing the wheels 21, being no longer held apart by the conductor, will be forced together by the spring 22, and if otherwise unsustained the wheels so in contact would move about their common hinge and fall below the line of the continuation of the conductor on the other side of the crossing, in which position they could not engage the said conductors. In order to overcome this, the glass plate 58 is provided at each crossing, and it is sustained at such a height by the bed-plate 57 that when the truck-wheels move off the pointed ends of the conductors the lower wheel will be in contact with and travel along the top of the glass plate, while the portions of the wheels in contact with each other will be on a level with the points of the conductors 23 on the other side of the crossing, so that when the latter point is reached the rims of the wheels will engage the opposite inclined edges of the pointed ends of the said conductors 23 and ride along the same and become separated against the action of the spring 22 until in their normal position on opposite sides of each conductor. During the travel across the glass plate the circuit through the trolley is broken and no current passes to the motor on the car; but this is immaterial, since the space over which the trolley must travel at the crossing is very short, being in the neighborhood of eighteen inches or two feet, and the momentum of the car, even when moving very slowly, will easily carry it such distance. The sheathing-plates 43 and 46 are continued to the corner-ribs 56 and are seated in them in a manner similar to that described with reference to the ribs 27. At the crossing the slot-plates 37 terminate in right-angled sections 65, each section being supported at the angle on the upper end of the respective corner-rib 56, so that the slots for the passage of the hanger 3 cross each other without interference.

Suitable man-holes 66 are provided at crossings and at intervals along each conduit.

In order to clear the conductors in front of the trolley-wheels from dirt or obstructions, so that the latter may at all times make good electrical connection with the conductors, I provide cleaning-brushes, such as shown in Figs. 2 and 5. There is an arm 67 projecting from the truck-body 6 at each side of the upper truck-wheels 21, and this arm terminates in an eye 68, through which extends a freely-moving guide-rod 69, at the lower end of which is a brush 70, of any suitable construction, and on the upper end of which is a weight 71, which tends at all times to maintain the brush in forcible contact with the upper rounded edge of the conductor. The rod 69 is prevented from falling through the eye 68 by means of the weight 71, before mentioned, and from being lifted therefrom by a collar 72 at its lower end or point of connection with the brush 70. It will be observed that this brush will readily accommodate itself to changes in the direction of travel and that brushes are provided at each side of the upper wheels 21. As will be evident, the weight may be replaced by a spring, and in this case the function and operation of the brush will be the same as though a weight were used.

Having now fully described my invention, I claim and desire to secure by Letters Patent—

1. In an electric railway, the combination of insulated electric conductors disposed along and parallel with the road with a contact-truck carried by the traveling vehicle, composed of contact-wheels for each conductor, the bearings of each wheel hinged, and the wheels maintained in yielding contact with opposite sides of the conductor, substantially as described.

2. In an electric railway, the combination of electric conductors disposed along and parallel with the road-bed with a contact-truck composed of pairs of contact-wheels, one pair for each conductor and adapted to bear upon the same on opposite sides, and a spring tending to force the wheels of each pair together, substantially as described.

3. In an electric railway, the combination of a traveling vehicle and a pair of insulated conductors disposed along and parallel with the road with a contact-truck carried by the vehicle, having contact-wheels embracing each conductor on opposite sides, and a spring for maintaining that contact, substantially as described.

4. In an electric railway, the combination of a traveling vehicle and an underground conduit disposed along and parallel with the road, and having two insulated conductors properly sustained in said conduit, with a hanger fixed to the vehicle extending into the conduit and carrying a pair of insulated conductors, each connected with a pair of contact-wheels embracing one of the conductors in the conduit, and a spring for each pair of contact-wheels, tending to force them together, substantially as described.

5. In an electric railway, the combination of two intersecting tracks and two corresponding intersecting conduits carrying bare conductors to convey current to vehicles traveling upon the track, each conductor having a gap at the intersection and an insulated bridging-conductor for each gap out of the line of the bare conductors, with hinged contact-trucks carried by each traveling vehicle, bearing upon the bare conductors, and a platform at the intersection for supporting said truck at the proper height for engagement with the bare conductors at said intersection, substantially as described.

6. In an electric railway, the combination of two intersecting tracks and two corresponding intersecting conduits, each carrying bare insulated conductors, pairs of pivoted and spring-actuated contact-wheels carried by the traveling vehicle and embracing the conductors, with conductors bridging a gap in each bare conductor at the intersection and wedge-shaped terminals for each bare conductor at the intersection for guiding the contact-rollers on opposite sides of the said bare conductors, substantially as described.

7. In an electric railway, the combination of two intersecting tracks and two corresponding intersecting conduits, each carrying bare insulated main conductors for conveying current to vehicles traveling upon the tracks by means of contact-trucks carried by the vehicle, with conductors bridging a gap in each conductor at the intersection and a platform supported at the intersection below the main conductors for sustaining the contact-trucks at the proper height at the gap for re-engagement with the bare conductor, substantially as described.

8. In an electric railway, an underground conduit disposed below the center of the road-bed and parallel therewith, said conduit being composed of spaced metallic ribs connected by webs at their lower ends, with slots in each rib and metallic sheathings sprung into said slots, and constituting the walls of the conduit, substantially as described.

9. In an electric railway, a conduit disposed below the center of the road-bed, and consisting of metallic ribs spaced and sheathed, as described, with slot-plates secured to the upper ends of said ribs, in combination with straining-rods extending from each rib near the slot-plate to the adjacent sleeper of the track-rail, whereby the closing of the slot is prevented, substantially as described.

In testimony whereof I have signed my name to this specification in the presence of two subscribing witnesses.

JAMES F. McLAUGHLIN.

Witnesses:
 EDWIN F. GLENN,
 JOSEPH LYONS.